United States Patent
Nowak et al.

(10) Patent No.: US 7,353,920 B2
(45) Date of Patent: Apr. 8, 2008

(54) FLUID COOLED BRAKE HOUSING

(75) Inventors: Stan Nowak, Balcatta (AU); Dorota Helena Kieronska, Balcatta (AU); Vin C. Morley, Balcatta (AU)

(73) Assignee: Safe Effect Pty Ltd, Balcatta (AU)

( * ) Notice: Subject to any disclaimer, the term of this patent is extended or adjusted under 35 U.S.C. 154(b) by 0 days.

(21) Appl. No.: 10/511,861

(22) PCT Filed: Apr. 14, 2003

(86) PCT No.: PCT/AU03/00443

§ 371 (c)(1),
(2), (4) Date: Feb. 8, 2005

(87) PCT Pub. No.: WO03/089803

PCT Pub. Date: Oct. 30, 2003

(65) Prior Publication Data

US 2005/0139437 A1 Jun. 30, 2005

(30) Foreign Application Priority Data

Apr. 15, 2002 (AU) .................................. PS 1736

(51) Int. Cl.
*F16D 55/02* (2006.01)
(52) U.S. Cl. ............... 188/71.6; 188/264 R; 188/73.31
(58) Field of Classification Search ............... 188/71.6, 188/264 R, 264 D, 264 F, 264 CC, 264 P, 188/274, 73.31, 73.47
See application file for complete search history.

(56) References Cited

U.S. PATENT DOCUMENTS

| | | | |
|---|---|---|---|
| 3,022,867 A | * | 2/1962 | Maloney et al. ........ 188/264 D |
| 3,530,965 A | | 9/1970 | Wilson |
| 3,633,714 A | * | 1/1972 | Klaue .......................... 188/134 |
| 3,915,262 A | * | 10/1975 | Klaue ........................ 188/71.6 |
| 4,014,410 A | | 3/1977 | Bryant |
| 4,262,789 A | * | 4/1981 | Collins .................. 192/113.31 |
| 4,508,200 A | * | 4/1985 | Cigognini ............... 188/264 P |
| 4,815,573 A | * | 3/1989 | Miyata .................... 188/264 F |
| 5,249,649 A | * | 10/1993 | Emmons .................. 188/73.47 |
| 5,394,963 A | | 3/1995 | Deane et al. |
| 5,445,242 A | | 8/1995 | Pogorzelski et al. |
| 6,321,882 B1 | | 11/2001 | Heckel et al. |

FOREIGN PATENT DOCUMENTS

| | | |
|---|---|---|
| DE | 11 60 319 B | 12/1963 |
| EP | 905404 A1 | 3/1999 |
| EP | 971150 A1 | 1/2000 |
| EP | 1096170 A1 | 5/2001 |
| WO | WO 94/21937 A2 | 9/1994 |

* cited by examiner

*Primary Examiner*—Melody M. Burch
(74) *Attorney, Agent, or Firm*—David W. Carstens; Carstens & Cahoon, LLP

(57) ABSTRACT

A housing (10) for a braking system (56) comprises a casing (12) defining a cavity (14) for housing one or more friction pads (15). The casing (12) is composed of a plurality of separate walls including a circumferential wall (16), back wall (18), and a front wall (20). The circumferential wall (16) is provided with an internal fluid flow path (36) and a fluid inlet (38) and fluid outlet (40) which communicate with the fluid flow path (36). When a supply (45) of fluid is connected with the fluid inlet (38) and outlet (40) via a fluid circuit (43), fluid is circulated through the fluid flow path (36) to cool the housing (10).

12 Claims, 3 Drawing Sheets

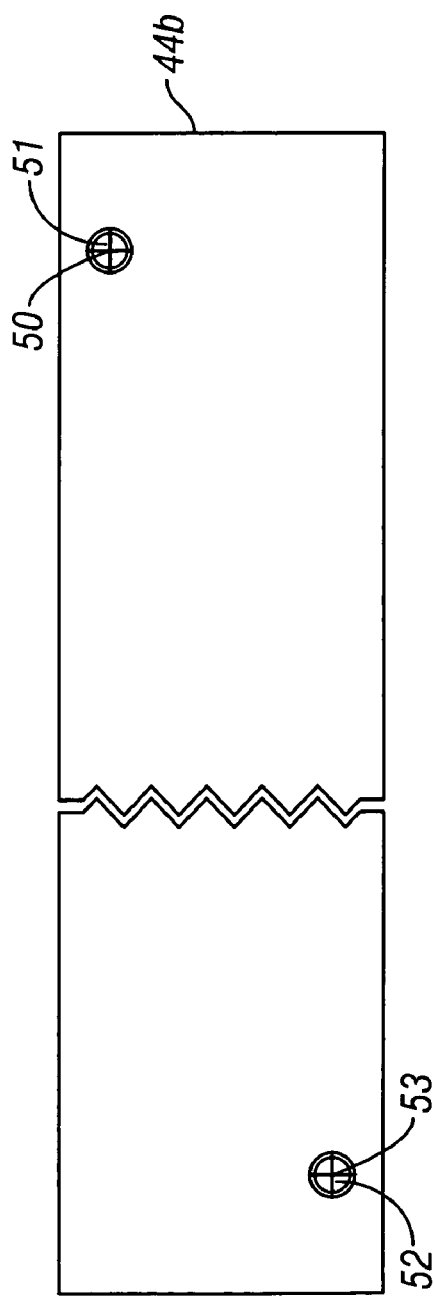
FIG. 3
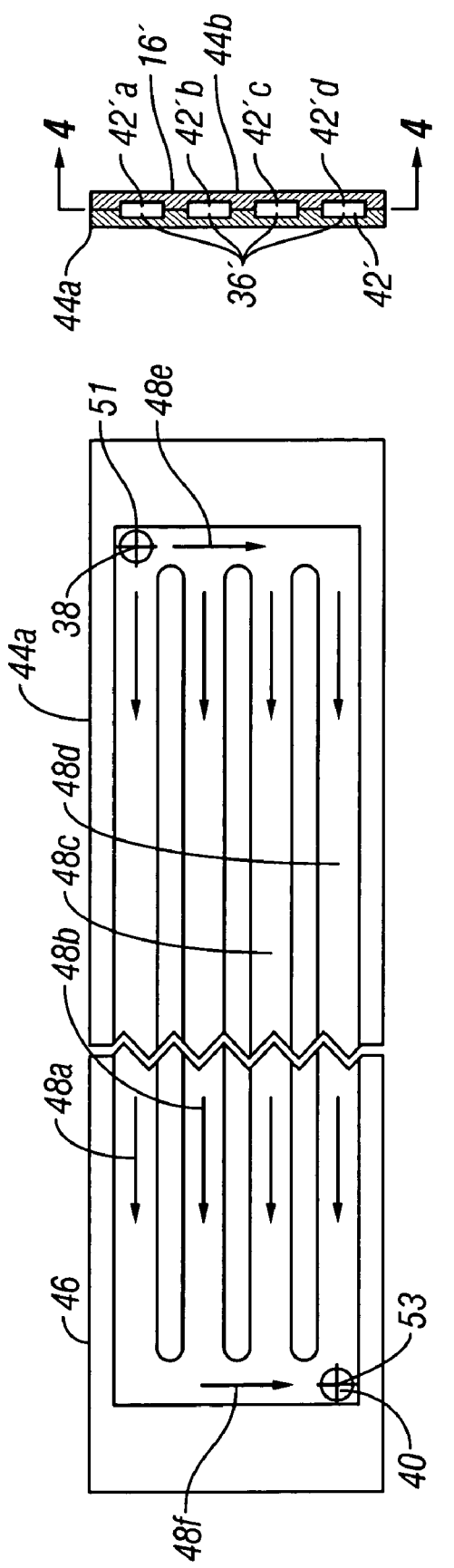
FIG. 4
FIG. 5

FLUID COOLED BRAKE HOUSING

FIELD OF THE INVENTION

The present invention relates to a fluid cooled brake housing and to a wall for forming a fluid cooled brake housing.

BACKGROUND OF THE INVENTION

It is well known that the performance of brake systems which comprise a friction pad bearing against a braking surface deteriorates as temperature of the brake system increases. It is therefore desirable to cool brake systems to optimise performance.

Various methods have been proposed for this purpose. For example, with disc brake systems, which comprise planar brake pads and a disc brake rotor, it is known to ventilate the system by drilling holes through the rotor.

In U.S. Pat. No. 6,321,882 B2 the Patentee proposes attaching a heat exchanger to the callipers of a bicycle disc brake system.

In sealed wet brake systems in which friction pads and braking surfaces are enclosed within an oil filled cavity, it is known to pass the oil through a radiator to effect cooling.

The present invention was developed to attempt to cool a brake system by providing a fluid cooled housing (or a wall thereof) which houses or is part of the brake system.

SUMMARY OF THE INVENTION

According to the present invention there is provided a fluid cooled brake housing including at least:

a casing defining a cavity for housing one or more friction pads, said casing having one or more walls, at least one of said walls provided with an internal fluid flow path, a fluid inlet in fluid communication with said fluid flow path, and a fluid outlet in fluid communication with said fluid flow path;

whereby, when a fluid supply is coupled with said fluid inlet, fluid flows through said wall via said fluid inlet, fluid flow path and fluid outlet, thereby cooling said housing.

Preferably said fluid flow path includes at least one channel between said fluid inlet and said fluid outlet.

Preferably said fluid flow path includes a plurality of parallel connected channels extending between said fluid inlet and said fluid outlet.

Preferably said housing further includes sealing means for sealing said cavity when said housing is mounted on an axle to provide a wet brake housing.

According to the invention there is further provided a wall for a brake housing, said wall including an internal fluid flow path, a fluid inlet in fluid communication with said fluid flow path, and a fluid outlet in fluid communication with said fluid flow path;

whereby, when a fluid supply is coupled with said fluid inlet, fluid flows through said wall via said inlet, through said fluid flow path and out said fluid outlet to cool said wall.

According to the invention there is further provided a fluid cooled brake system including:

a fluid cool brake housing having a casing defining a cavity, said casing having one or more walls, at least one of said walls provided with an internal fluid flow path, and a fluid inlet and a fluid outlet each in fluid communication with said fluid flow path;

one or more brake pads disposed in said cavity;

a braking surface located within said cavity;

an actuator for selectively moving said one or more brake pads into contact with said braking surface; and, a supply of cooling fluid external of said cavity and in fluid communication with said fluid inlet and said fluid outlet, whereby said cooling fluid circulates through said supply, said fluid inlet, fluid flow path and fluid outlet.

Preferably said fluid cooled brake system further includes a pump for pumping said cooling fluid through said supply and said fluid flow path.

Preferably said fluid cooled brake system includes a heat exchanger in fluid communication with said supply for cooling said cooling fluid.

Preferably said fluid cooled brake system further includes a volume of fluid sealed within said cavity and at least partially covering said braking surface, said fluid separate from said cooling fluid.

BRIEF DESCRIPTION OF THE DRAWINGS

Embodiments of the present invention will now be described by way of example only with reference to the accompanying drawings in which:

FIG. 3 is a section view of a wall for a fluid cooled brake housing;

FIG. 4 is a view of section B-B of the wall depicted in FIG. 3;

FIG. 5 is a plan view of the wall depicted in FIG. 3; and,

DETAILED DESCRIPTION OF PREFERRED EMBODIMENTS

Figure 2:
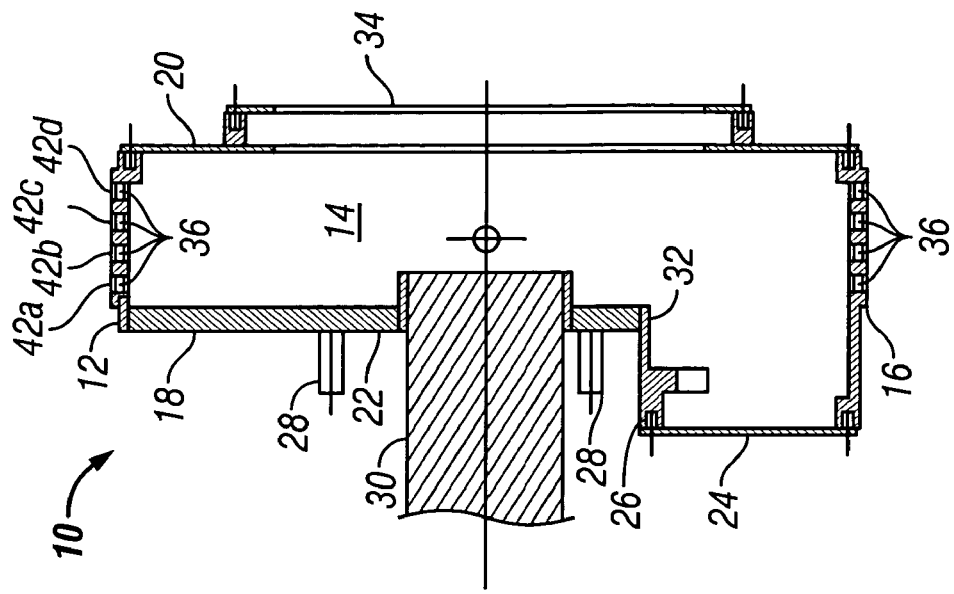
FIG. 2 is a view through section A-A of the brake housing depicted in FIG. 1.
Figure 1:
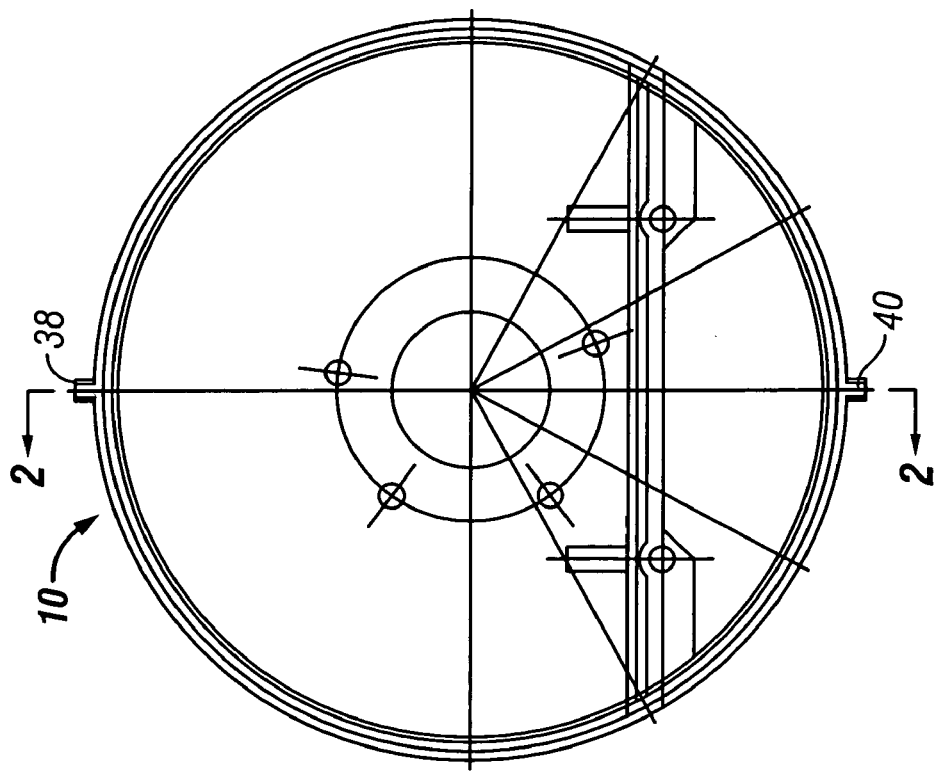
FIG. 1 is a plan view of an embodiment of a brake housing in accordance with the present invention.

FIGS. 1 and 2 depict an embodiment of a fluid cooled brake housing 10 in accordance with the present invention. The housing 10 is comprised of a casing 12 which defines a cavity 14 for housing one or more friction pads 15 (shown in FIG. 6). The expression "friction pads" is used throughout this specticiation to denote any form of friction pad used in a braking system, or indeed any other type of pad that can be applied to a braking surface to provide a braking effect. The casing 12 is composed of a plurality of separate walls including circumferential wall 16, back wall 18 extending across one axial end of the circumferential wall 16. The back wall 18 is composed of a main wall section 22 and a secondary wall section 24. The main wall section 22 extends for over half the radius of the circumferential wall 16 and includes an axially extending portion. The secondary wall 24 extends from the axially extending portion 26 to the circumferential wall 16. Axially extending studs 28 are provided on the back wall 18 outside the cavity for coupling the housing 10 to a differential housing (not shown). An axial hole is formed in the back wall 18 through which an axle 30 can extend into the cavity 14. The axle 30 is circumscribed by a bass 32. The front wall 20 is also provided with a larger axial hole 34 for typically receiving a wheel hub and rotor (not shown).

One of the walls, and in this particular embodiment, the circumferential wall 16, is provided with an internal fluid flow path 36, a fluid inlet 38, and a fluid outlet 40. Both the fluid inlet 38 and fluid outlet 40 are in fluid communication with, and spaced by, the fluid flow path 36. When a fluid supply (not shown) is connected with the fluid inlet 38, fluid can flow through the fluid flow path 36 and out through the outlet 40 to absorb heat from and thus cool the wall 16 and the housing 10.

It should also be noted that the configuration of the walls of the housing 10 is not in itself significant to the present invention. The walls and indeed the housing 10 are configured to meet the application at hand. The housing 10 depicted in FIGS. 1 and 2 is particularly well suited as a housing for a wet brake system where the cavity 14 houses a brake drum and brake shoes. Such a system is described in the Applicants' copending Australian provisional application No. PR 0187 the contents of which are incorporated herein by way of reference. In such an embodiment, the housing 10 is provided with appropriate seals to retain a volume of oil in which the brake components, eg the drum and the brake shoes operate. The fluid passing through the fluid flow path 36 is separate to the fluid held within the cavity 14 of the wet brake system.

The fluid flow path 36 as shown in FIG. 2 is formed with four channels 42a-42d. These channels may be series connected so as to in effect form one continuous zig-zag or serpentine channel extending between the inlet 38 and outlet 40. Alternately, and preferably, the channels 42a-42d are separate parallel connected channels as shown in the embodiment depicted in FIGS. 3-5 described in more detail below.

The fluid flow path 36 can be made in a variety of ways including initially providing the circumferential wall 16 as a flat strip of material and machining a set of grooves on one surface corresponding to the location of the channels 42a-42d, providing a second flat strip of material in which a further set of grooves are machined and then attaching the two strips together so that the grooves overlay each other to form channels 42a-42d then rolling the strip about an axis to form a ring and welding the ends together. Separate holes can then be drilled into the strip to form the inlet 38 and outlet 40. However different techniques can also be used.

The fluid flowing through the channels 42a-42d circulates through a fluid circuit 43 (refer FIG. 6) which is connected between the inlet 38 and outlet 40. This circuit includes a reservoir or supply 45 of cooling fluid (such as water or oil), a conduit extending from the reservoir to the fluid inlet 38, and then a further conduit extending from the fluid outlet back to the reservoir. If desired, a radiator 47 or other heat exchanger may be provided in this circuit. Indeed the conduits themselves (or one of them) may be configured to act as a heat exchanger. For example one of the conduits can be made from a metal tube and located in an air draught or air flow path. A pump 49 is included in the fluid circuit to circulate the fluid through the fluid flow path 36 and the reservoir and/or heat exchanger (if provided).

FIGS. 3-5 depict a planar wall 16' which may be used as a component of a fluid cooled housing of a different configuration to that depicted in FIGS. 1 and 2. More particularly, the wall 16' can be used in a housing in the shape of a square or rectangular prism. The wall 16' is provided with an internal fluid flow path 36' comprising four channels 42'a-42'd. The wall 16' is made from two strips of material 44a and 44b. Each of the strips 44a and 44b is provided with a central region 46 inboard of its periphery in which there is formed a plurality of grooves 48a-48f. Grooves 48a-48d are parallel to each other and extend in the direction of the length of the strips 44a and 44b. These grooves are connected in parallel, in terms of fluid flow, by transversely extending grooves 48e at one end and 48f at an opposite end. A hole 51 is formed in each of the strips 44a and 44b opening onto respective grooves 48e, with a second bole 53 being formed in each of the strips 44 opening onto respective grooves 48f. Conduit attachments 50 and 52 are coupled to the holes on strips 44a and 44b.

The strips 44a and 44b are formed of identical configuration with the grooves 48 being one half the depth of the channels 42'. The wall 16' is completed by attaching the two strips 44a and 44b together with their respective channels in registration. The holes 51 form fluid inlet port 38 and the holes 53 form the fluid outlet port 40 in the strip 44a. However one of each of the holes 51 and 53 is sealed so that the holes 51 and 53 open onto the outside surface of one of the walls 16' only, that being, in this case, constituted by the outside surface of strip 44b. The wall 16' can then be incorporated into a brake housing with other walls to define a casing within which there is disposed a braking system. One or more of these other walls may also be of similar construction to the wall 16'. As with the embodiment depicted in FIGS. 1-2, the fluid flow path 36 of the wall 16' is coupled to a fluid circuit having a reservoir, a pump and optionally, a radiator or other heat exchanger.

Instead of forming holes 51 and 53 in both strips 44a and 44b and then sealing the holes in one of these strips, the holes 51 and 53 could of course be formed in one of the strips only, with the couplings 50 and 52 being provided on the same strip.

Figure 6:
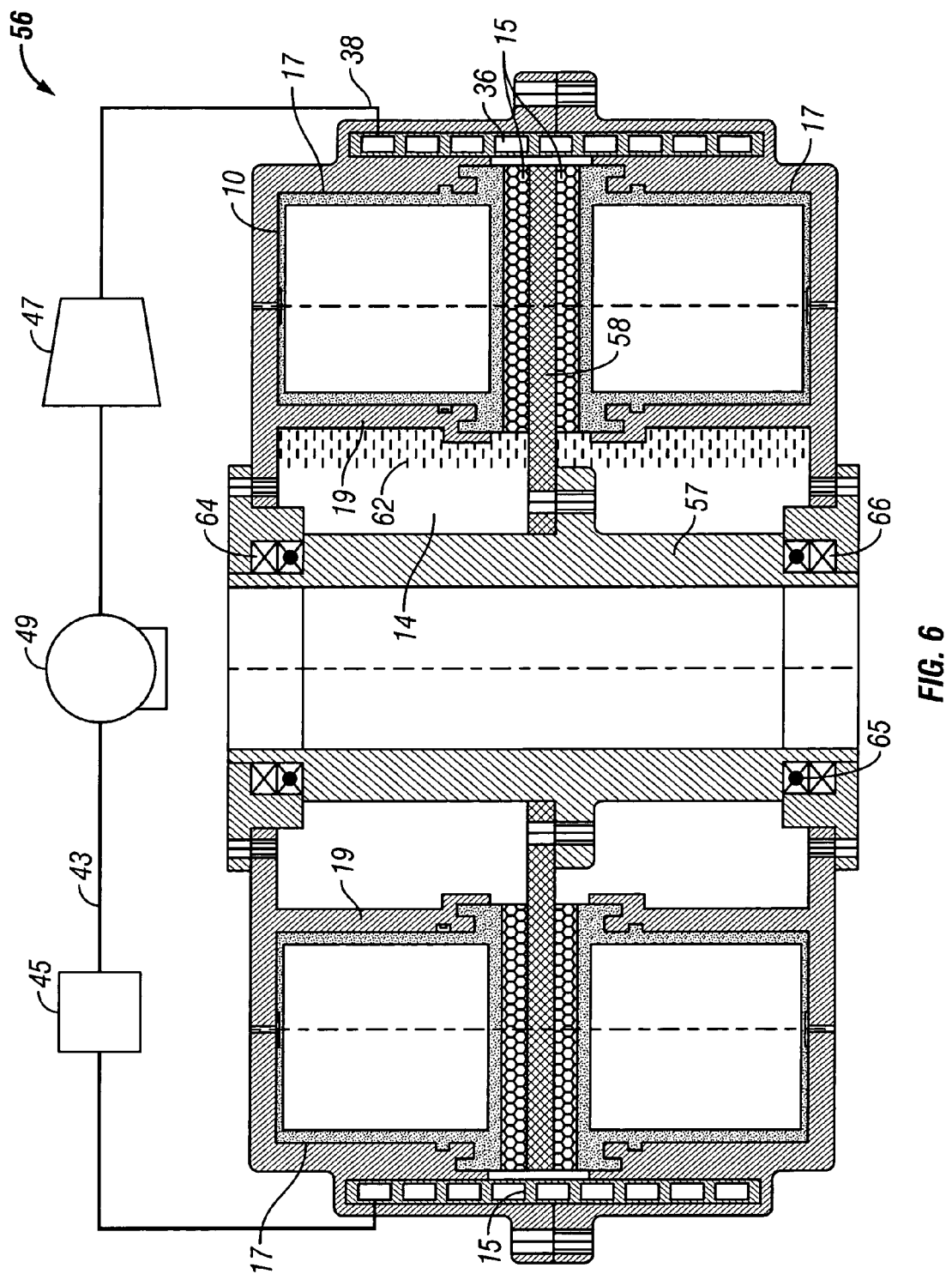
FIG. 6 is a schematic representation of a brake system incorporating an embodiment of the fluid cooled housing depicted in FIG. 2.

FIG. 6 depicts a brake system 56 incorporating an embodiment of the housing 10 and a fluid circuit 43 connected between the housing fluid inlet and outlet 40. This circuit also includes a supply 45 of cooling fluid, a pump 49 and a heat exchanger 47 as described hereinabove. In this particular form, the brake system 56 is a disc brake system with a brake rotor 58 mounted on the wheel hub and shaft 57 which extend into the housing 10. Disc brake pads 15 and associated pistons 17 and cylinders 19 are disposed on each side of the rotor 58 within the housing 10. The cylinders 19 may be formed integrally with the housing 10. The brake system 56 is a wet brake system where the cavity 14 retains a volume of fluid such as oil 62 which contacts the braking components such as the brake pads 15 and rotor 58 to reduce wear. It should be understood that the fluid 62 is completely separate and isolated from the fluid circulated through the circuit 43. Rotary seals 64 and 66 are provided to seal against wheel hub and shaft 57 to prevent loss of the fluid 62, with the bearings 65 providing rotational decoupling between the housing 10 and shaft 57.

Now that embodiments of the present invention have been described in detail, it will be apparent to those skilled in the relevant arts that numerous modifications and variations may be made without departing from the basic inventive concepts. For example, in the illustrated embodiments, the fluid flow path 36 is depicted as being formed by two opposing grooves formed in separate components placed in facing relationship where each groove is one half the depth of the channels. However the full depth of the channels may be formed in one component with a second plain strip being sealed thereover to seal the channels. Further, the fluid flow path 36 may be formed by other techniques such as forming or casting.

The housing 10 may also of course house a wet disc brake system comprising one or more brake disc pads and rotors. In such an embodiment, it is likely that the actual configuration of the housing 10 will vary from that depicted in present FIGS. 1 and 2.

All such modifications and variations are deemed to be within the scope of the present invention the nature of which is to be determined from the above description and appended claims.

The claims defining the invention are as follows:

1. A fluid cooled brake housing for a brake system that includes friction pads and a rotatable element to be braked, the housing comprising:
   a circumferential wall and two axial end walls that define a cavity for housing the friction pads and rotatable element;
   an opening in at least one of the axial end walls through which a portion of the rotatable element can extend;
   a fluid flow path formed around the periphery of the circumferential wall such that the fluid flow path is external to the defined cavity;
   a fluid inlet in fluid communication with the fluid flow path;
   a fluid outlet in fluid communication with the fluid flow path;
   a supply of cooling fluid in fluid communication with the fluid inlet and the fluid outlet, the cooling fluid flowing from the fluid inlet through the fluid flow path to the fluid outlet thereby cooling the entire brake housing; and
   a seal means for sealing the opening such that the cavity can be at least partially filled with a volume of lubricating fluid to provide a wet brake housing.

2. The housing according to claim 1, wherein said fluid flow path includes at least one channel between said fluid inlet and said fluid outlet.

3. The housing according to claim 1, wherein said fluid flow path includes a plurality of parallel connected channels extending between said fluid inlet and said fluid outlet.

4. The housing according to claim 1 further comprising a pump for circulating the cooling fluid through the fluid flow path.

5. The housing according to claim 4 further comprising a heat exchanger in fluid communication with the supply for cooling the cooling fluid.

6. The housing according to claim 1 further comprising a volume of lubricating fluid sealed within the cavity and at least partially covering the rotatable element, the lubricating fluid separate from the cooling fluid.

7. An improved housing for cooling a friction-type braking system, wherein the friction-type braking system utilizes friction pads to slow the rotation of a rotatable element, the housing comprising:
   a cavity for containing the friction pads and rotatable element, the cavity comprising:
      a circumferential wall;
      a first end wall, the first end wall having an attachment means to affix the housing to a chassis member; and
      a second end wall, the second end wall having an opening through which a portion of the rotatable element can extend;
   a fluid flow path formed around the periphery of the circumferential wall such that the fluid flow path is external to the cavity;
   a fluid inlet in fluid communication with the fluid flow path;
   a fluid outlet in fluid communication with the fluid flow path; and
   a supply of cooling fluid in fluid communication with the fluid inlet and the fluid outlet, the cooling fluid flowing from the fluid inlet through the fluid flow path to the fluid outlet thereby cooling the entire housing.

8. The housing of claim 7 wherein the cavity is sufficiently large to completely contain at least one disc brake caliper.

9. The housing of claim 7, wherein the fluid flow path includes a plurality of parallel channels extending between the fluid inlet and the fluid outlet.

10. The housing of claim 7 further comprising a heat exchanger for cooling the cooling fluid.

11. The housing of claim 7 further comprising:
   a heat exchanger for cooling the cooling fluid; and
   a pump for circulating the cooling fluid through the fluid flow path.

12. The housing of claim 7 further comprising:
   a seal means for sealing the cavity; and
   a volume of lubricating fluid sealed within the cavity and at least partially covering the rotatable element, wherein the lubricating fluid is physically separate from the cooling fluid.

* * * * *

UNITED STATES PATENT AND TRADEMARK OFFICE
CERTIFICATE OF CORRECTION

PATENT NO. : 7,353,920 B2 Page 1 of 1
APPLICATION NO. : 10/511861
DATED : April 8, 2008
INVENTOR(S) : Nowak et al.

It is certified that error appears in the above-identified patent and that said Letters Patent is hereby corrected as shown below:

In the Specification:
Column 2
Line 46, please replace "specticiation" with --specification-- therefore.
Line 47, please insert --for example a disc brake pad used in disc brake systems or a brake shoe used in a drum brake system-- after "system" and before the comma (,).
Line 51, please insert --, and a front wall 20 extending about an opposite axial end of the circumferential wall 16-- after the number "16" and before the period (.).
Line 55, please insert --26-- after "portion" and before the period (.) therefore.
Line 58, please delete "outside the cavity for" and insert --outside of the cavity 14 for-- therefore.

Column 4
Line 3, please delete "bole" and insert --hole-- therefore.

Signed and Sealed this

Eighth Day of July, 2008

JON W. DUDAS
*Director of the United States Patent and Trademark Office*